Sept. 17, 1935.  N. G. POLGOV  2,014,634

BUS SUPPORT

Filed Dec. 6, 1930  2 Sheets-Sheet 1

Inventor
Nicholas G. Polgov
By
Attorney

Sept. 17, 1935.　　　　N. G. POLGOV　　　　2,014,634
BUS SUPPORT
Filed Dec. 6, 1930　　　　2 Sheets-Sheet 2

Inventor
Nicholas G. Polgov
By
Attorney

Patented Sept. 17, 1935

2,014,634

UNITED STATES PATENT OFFICE 2,014,634

BUS SUPPORT

Nicholas G. Polgov, Chicago, Ill., assignor to Delta-Star Electric Company, Chicago, Ill., a corporation of Illinois Application December 6, 1930, Serial No. 500,570

3 Claims. (Cl. 173—251)

This invention relates to bus bar supports which are intended mainly for use with relatively low voltages. These bus supports may be readily used in manholes, storage battery rooms, and general bus structures, such as for railway work and telephone switchboards.

A feature of these bus supports resides in the identical formed halves which are connected together by interfitting lugs and are clamped with bolts to hold the bus supports over tubular supporting members either in direct contact therewith, or insulated from the same. The simplicity of the structure provides an economical assembly and reduces the number of parts required in making up the bus support unit. The bus support unit is formed of just the two members, each of which are identical, and by means of the proper clamping bolts these parts can be adjusted and held in operative position. The members are designed of a nature to provide the necessary sturdy construction to permit the bolts to clamp the parts firmly in place and the interfitting lug portions of the two members of the bus support keep the members in alinement in clamping the same together by the clamping bolts. One member of the bus support may be made of iron and the other of bronze so as to reduce eddy currents if it is desired.

The bus clamp unit is particularly adapted for use with the regular pipe framework which supports the bus supporting members. The primary advantages of this bus clamping unit construction for low voltage bus work is economy, not only in the first cost, but in saving of space, which is very important on work of this kind. On very high capacity bus runs bars may be spaced for better circulation of air and distribution of current without necessitating expensive insulator supports. When the bars are of the same polarity they can all be placed on the same supporting member without insulation, while the supporting member only is insulated from the ground at the points where it is supported.

The structural advantages and features of primary importance, together with other details will be more fully and clearly defined and set forth in the specification and claims.

Figure 5:
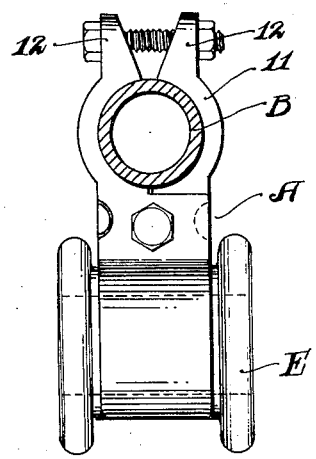
Figure 5 illustrates another form of the bus supporting unit, showing a varied use of the same.
Figure 6:
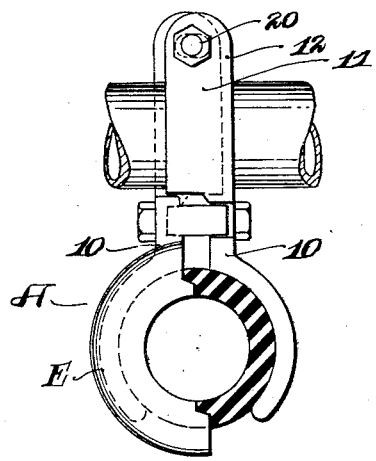
Figure 6 is a view of the bus unit illustrated in Figure 5 from a position at right angles to Figure 5, and showing a part of the insulator in section.
Figure 7:
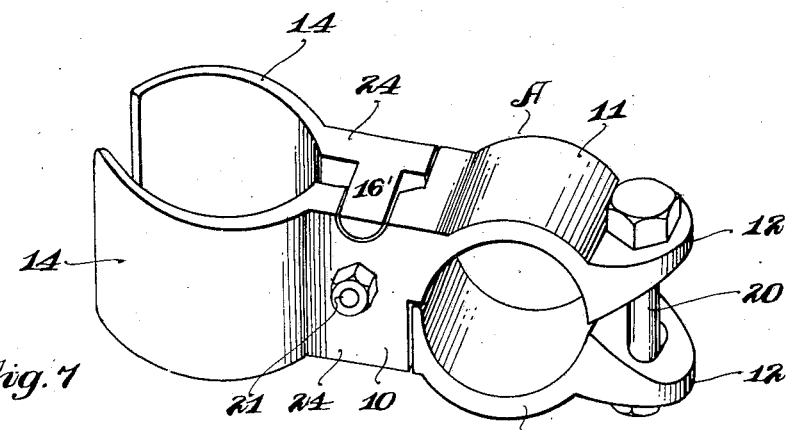
Figure 7 is a perspective view of the bus supporting unit and clamp of the construction illustrated in Figures 5 and 6.
Figure 8:
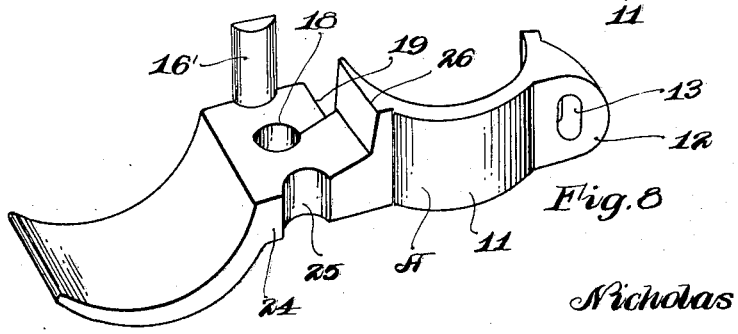
Figure 8 is a perspective view of one of the clamping members of the bus support of Figures 5 and 6 and 7.

The bus supporting unit A provides a clamping means which is adapted to engage a pipe B which may be insulated by the insulating sleeve C of any suitable insulating material or the unit A may be directly connected to the pipe B as illustrated in Figures 5 and 6.

The unit A includes two side clamping members 10 which are identical in formation, each of which is formed with a loop portion 11 with a projecting ear 12 in which a bolt hole 13 is formed. The ear 12 is formed on one side of the loop 11. On the opposite side of the loop 11 the side or clamping member 10 of the unit A is formed with an extended clamping arm 14 which may extend straight as in the structure illustrated in Figures 1 to 4, inclusive, or may be curved like the form illustrated in Figures 5 to 8, inclusive.

Figure 1:
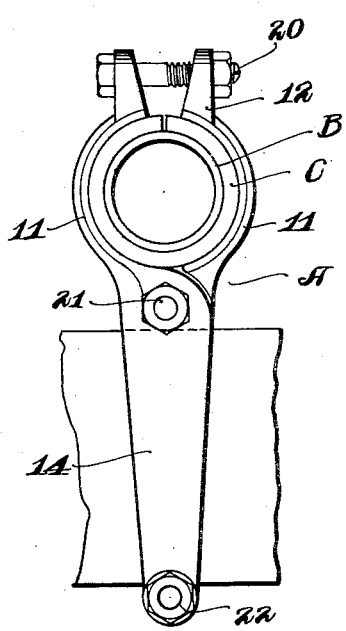
Figure 1 illustrates the bus supporting unit in operative position, only a detail of the bus bars being illustrated.
Figure 2:
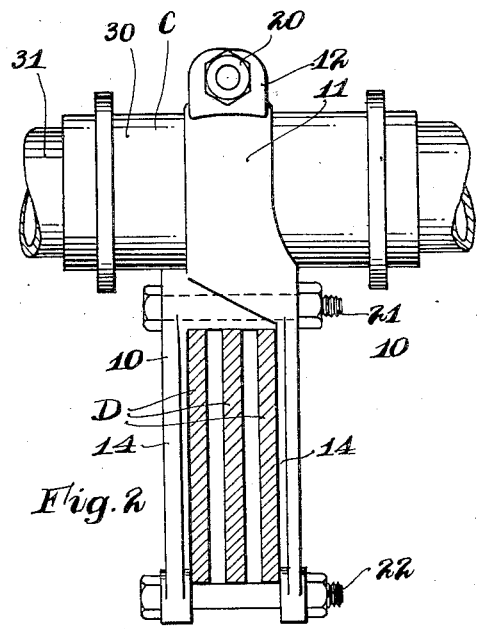
Figure 2 is a view of the bus supporting unit in the opposite direction to Figure 1.

The clamp A in Figure 2 may be mounted on the insulating tube 30 which may be made of a combination of materials molded into the desired form which include formaldehyde, carbolic acid, and wood pulp, or other similar insulating material and which is preferably reinforced by the iron pipe 31. This forms a very substantial support for the bus supporting unitary clamp A. It is obvious, however, that the clamp A may be directly connected to the pipe if it is desired, rather than to the insulating material.

In the straight formation of the clamping arms 14 of the sides 10 the end of the same is formed with a bolt hole 15 while the inner end of the arm carries an integral lug 16. This lug is formed with a bolt recess 17 which coincides with the bolt hole 18 formed in the side of the arm 14.

Figure 3:
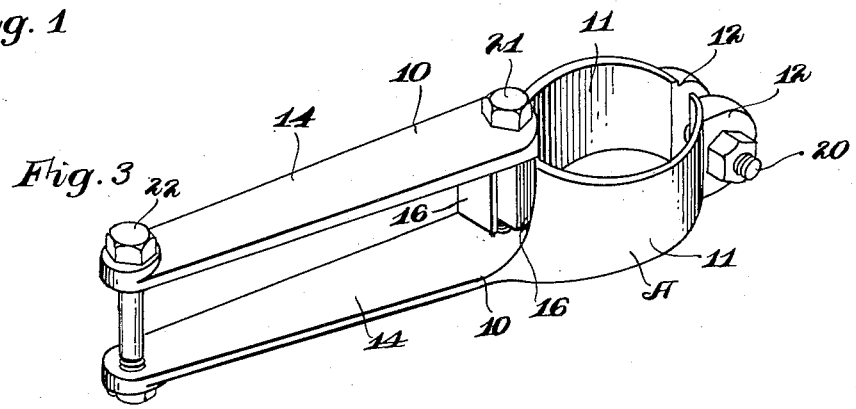
Figure 3 is a perspective of the bus supporting unit and clamp as it would appear removed from the support and free of the bus bars.
Figure 4:
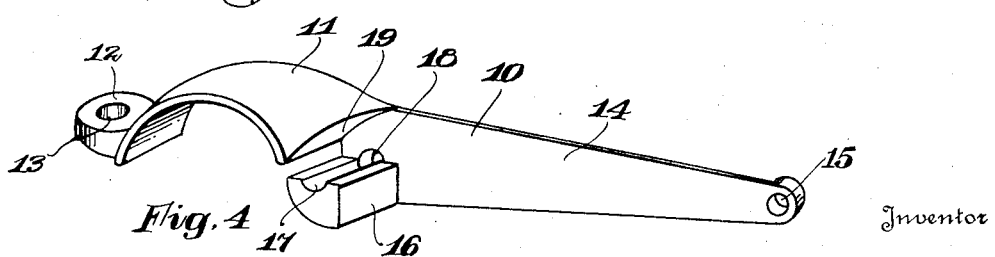
Figure 4 is a perspective view of one side of the clamp of the bus unit.

The loop 11 is formed integral with the arm 14 and is shaped to provide a recess 19 opposite the lug 16 and where the loop joins integrally with the arm 14. This recess 19 is adapted to receive the lug 16 on the opposite side member 10 of the unit A. The sides 10 are formed identical so that each side is formed with an arm 14 and a lug 16, together with a recess 19. This permits the members 10 to be fit together as illustrated in Figure 3, with the lug 16 of the respective sides 10 interfitting into the respective recesses 19 and providing the bolt recesses 17 which coincide with the bolt openings 18 in the respective arms 14.

Thus when the members 10 are interfit the lugs 16 hold the side members 10 in alinement and by means of the clamping bolts 20, 21, and 22, which extend through the openings 13, 18 and 15, respectively, the sides 10 of the bus supporting unit A may be connected together as illustrated in the drawings. The bolts hold the sides 10 together and clamp the loop portions 11 over the pipe supporting frame B, holding the bus unit in position while the bus bars D extend between the arms 14, being held in operative position therebetween.

In the structure of the bus supporting clamp or unit A of Figures 5 to 8, inclusive, the sides 10 are formed with the loop portions 11, together with the bolt supporting ear portions 12 and the bolt receiving opening 13. The bolt receiving opening 13 is elongated in both forms of the clamp unit A.

In this form of the bus unit A the sides 10 have the arms 14 which extend from the loops 11 of a curved nature so as to fit over a round or circular member such as the insulator sleeve E, illustrated in Figures 5 and 6, and the ends of the arms 14 are spaced by the straight side portions 24 from the loop portions 11. The portions 24 connect the ends 14 of the arms with the loops 11. In this structure only the two clamping bolts 20 and 21 are used to hold the sides 10 clamped over the pipe B and around the insulator such as E when the unit is connected together. The straight portion 24 of this clamp formation is provided with inwardly extending lugs 16' which are formed semicylindrical with the flat side extending toward the outside and the curved portion toward the inside. The groove 25 is formed in the edge of the straight portion 24 opposite to the lug 16' which is adapted to receive the lug 16' of the opposite side 10. In this form of the clamp bus support unit both of the sides 10 are formed identical so that they interfit and each is formed with a recess 19 which receives the shoulder portion 26 of the opposite side 10. In other words, both sides 10 of the bus supporting unit are identical and they interfit and are connected together in such a manner so that the lugs 16' with the shoulder portions 26 fitting into the recesses 19 hold the sides 10 in alinement so that the clamping bolts 20 and 21 may operate to clamp the members together and the sides interfit in such a manner as to be held in the correct position while they are clamped by the bolts over the supporting pipes and insulators.

In each of the structures set forth and illustrated it is economy in manufacture to provide the sides of identical formation and of such a peculiar construction as to fit one into the other so as to hold the sides in alinement. This makes it easy for the workmen to connect these bus supporting units and reduces the space required for these units together with simplifying the handling of the parts. The advantages of these bus supports as a unit made from two identical members held by the clamping bolts will be quite apparent in providing bus supports for low voltages and for use where a limited space is available owing to the compact structure, the sturdy formation, and the simplicity in handling the parts to connect the same in a manner to form the bus unit support. This bus unit also has the advantage of permitting one member to be made of one material and another of another material which will reduce eddy currents. The pipe bar combination may be used more in switchboard work and for telephone storage battery control panels. In these cases the bus bar can be insulated by taping under the clamp or by clamping to a steel pipe covered with fibre such as C or fibre insulated paper over the pipe or the clamping loop 11 may be extended over an insulated rod or bar of any suitable material.

In close quarters this bus support adapts itself very readily to provide a holding means for the bus members or cables and when used in manholes for supporting cable runs that fan out along the sides of the hole, it is only necessary to install a piece of galvanized iron pipe running vertically from the roof to the floor and spaced a few inches from the wall. The bus supporting unit has many other typical uses with regular pipe frameworks such as are usually used with indoor switchboard equipment and cable racks.

These features which include not only economy in first cost but in saving of space which is very important in this type of work, increase the utility and practical nature of my bus supporting unit. In using this bus supporting unit on high capacity bus runs, bars may be spaced for better circulation of air and distribution of current without necessitating expensive insulating supports. Further, when the bars are of the same polarity, they can all be placed on the same supporting member without insulation, the supporting member only being insulated from the ground at the points where it is supported.

In accordance with the patent statutes, the principal structure and formation of my bus supporting unit and cable support have been set forth in a manner in which I believe represents the best embodiment thereof, however, obvious changes and detail within the scope of the following claims shall be considered as a part hereof.

I claim:

1. In combination, a supporting structure including, a tube formed of insulating material having an internal reinforcement extending therethrough, a pair of clamping members, clamping ends adapted to virtually encircle said insulating tube intermediate the ends thereof, bolt means for holding said clamping members rigidly to said insulating tube, interlocking lugs and recesses in which said lugs may slide formed on each of said clamping members to hold said members slidably longitudinally aligned and to prevent excessive pivoting of said members, and ends opposite said first named clamping ends adapted to extend in close proximity to said insulating support and adapted to provide a bus and cable support for continuous electrical conductors.

2. An electrical conductor supporting unit including, a pair of plate-like members having virtually an identical structure and formation throughout, loop portions formed on one end of said members, bolt receiving ears projecting beyond said loop ends, an elongated bolt receiving slot in each of said ears, interlocking slidable lug and recess portions holding said loop ends in slidable longitudinal alignment formed between the ends of said plate members and insulator supporting ends oppositely disposed to said loop ends.

3. An electrical conductor supporting unit including, a pair of plate-like clamping members, loop engaging ends formed on one end of said members, interlocking lugs and recessses formed between the ends of said plate-like members, the lugs of each plate projecting toward the other plate and interfitting in said recesses, ends formed opposite said loop ends adapted to provide a cable or bus bar supporting means, said interlocking lugs and recesses holding said loop ends in slidable longitudinal alignment and said loop ends from excessive pivoting, and clamping bolts extending through said plates on either side of said loop ends.

NICHOLAS G. POLGOV.